(12) United States Patent
Wu et al.

(10) Patent No.: US 12,124,060 B2
(45) Date of Patent: Oct. 22, 2024

(54) PRISM TO ENABLE LARGE FOV HIGH RESOLUTION SAMPLING WITH SMALLER FOV IMAGING SYSTEM

(71) Applicant: MLOptic Corp, Redmond, WA (US)

(72) Inventors: Pengfei Wu, Nanjing (CN); Wei Zhou, Sammamish, WA (US); Jiang He, Nanjing (CN); Siyuan Liang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 503 days.

(21) Appl. No.: 17/564,190

(22) Filed: Dec. 28, 2021

(65) Prior Publication Data

US 2023/0204831 A1    Jun. 29, 2023

(51) Int. Cl.
*G02B 5/04* (2006.01)
*G02B 27/01* (2006.01)

(52) U.S. Cl.
CPC ........... *G02B 5/04* (2013.01); *G02B 27/0172* (2013.01); *G02B 2027/0123* (2013.01)

(58) Field of Classification Search
CPC ........ G02B 5/04; G02B 5/045; G02B 5/0816; G02B 5/122; G02B 27/01; G02B 27/017; G02B 27/0101; G02B 27/0172; G02B 27/0176; G02B 2027/0123; G02B 2027/0138; G02B 2027/0187; G02B 2027/0198

See application file for complete search history.

(56) References Cited

U.S. PATENT DOCUMENTS

| | | | | |
|---|---|---|---|---|
| 9,244,277 | B2* | 1/2016 | Cheng | G02B 27/0172 |
| 2013/0315275 | A1* | 11/2013 | Iwase | H01S 3/08 |
| | | | | 372/100 |
| 2015/0205347 | A1* | 7/2015 | Border | G06F 3/013 |
| | | | | 345/156 |
| 2020/0233189 | A1* | 7/2020 | Smith | G02B 27/0172 |
| 2021/0199993 | A1* | 7/2021 | Peli | G02B 27/00 |

* cited by examiner

*Primary Examiner* — Sultan Chowdhury
(74) *Attorney, Agent, or Firm* — Jong Patent Firm; Cheng Ning Jong; Tracy P. Jong

(57) ABSTRACT

A prism module for enabling a large field of view high resolution sampling of incoming rays, the prism module including a plurality of elongated prisms disposed about a central axis, each of the prisms including a fore surface; an aft surface; and a reflecting surface connected on a first edge to the fore surface and connected on a second edge to the aft surface, wherein the fore surface is configured to receive the incoming light rays orthogonally disposed with respect to the fore surface, the reflecting surface configured to reflect the incoming light rays to cause outgoing light rays to exit at a right angle through the aft surface to form an image with a maximum distortion not recognizable by a human eye.

8 Claims, 23 Drawing Sheets

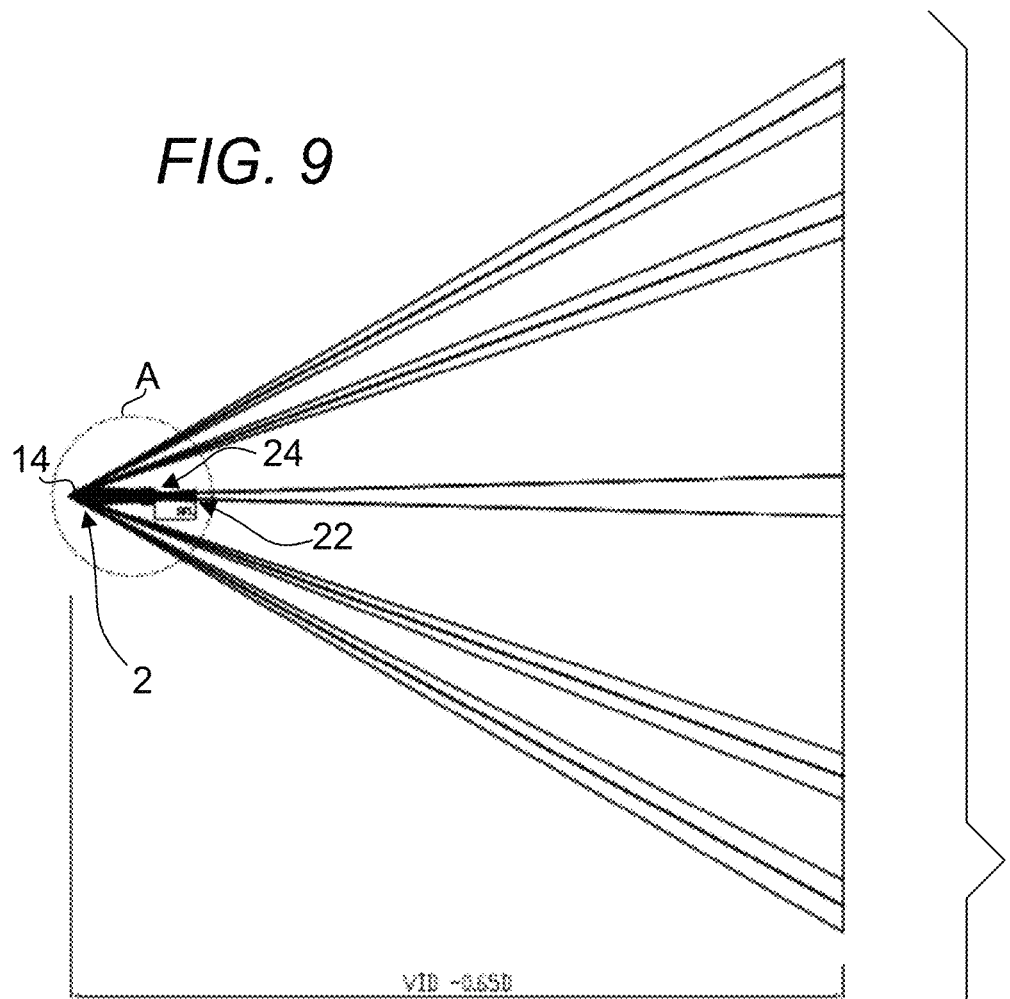
FIG. 9
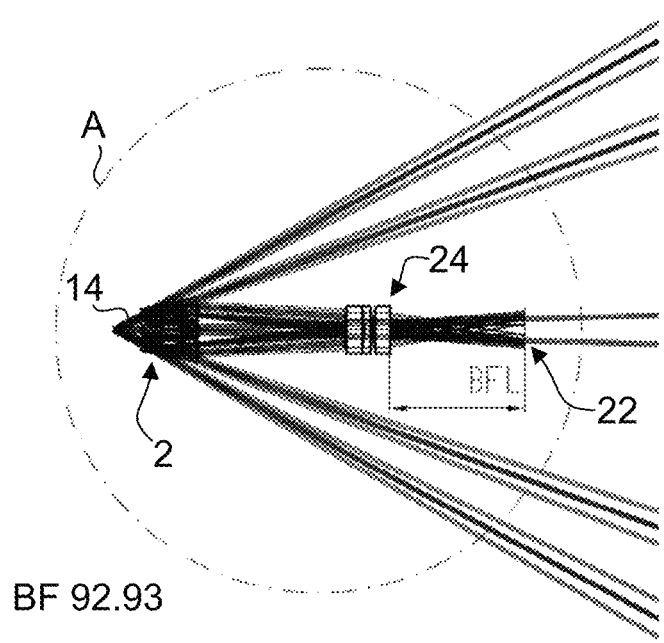
BF 92.93

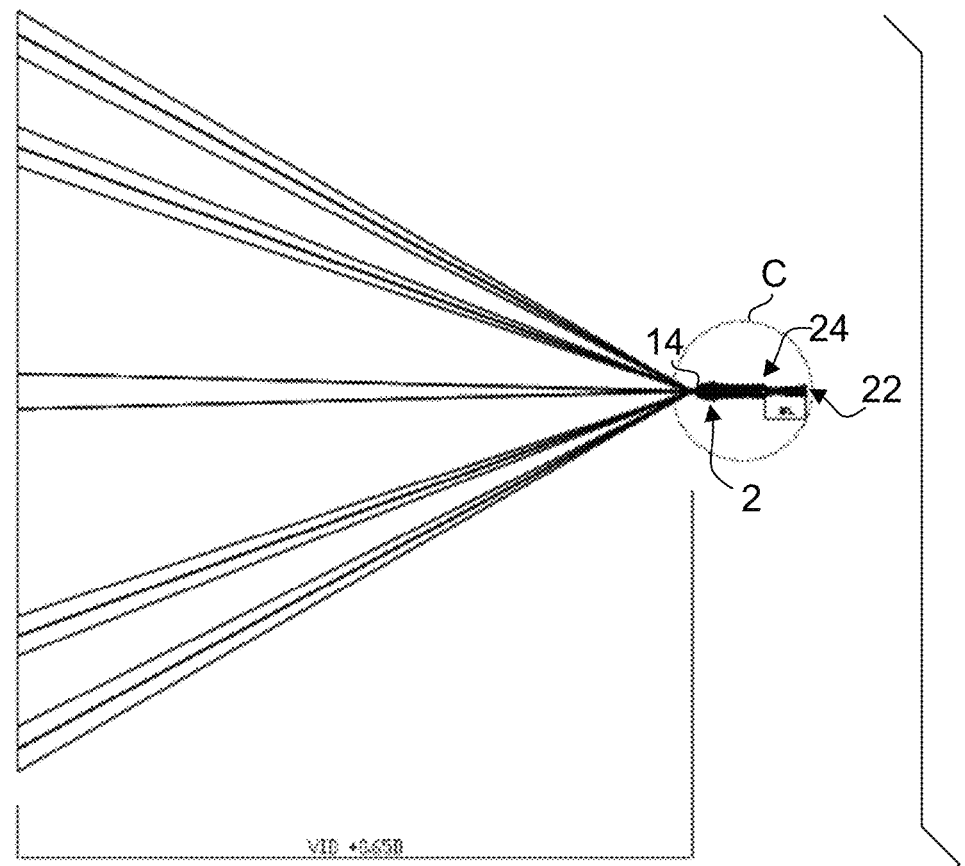
*FIG. 11*
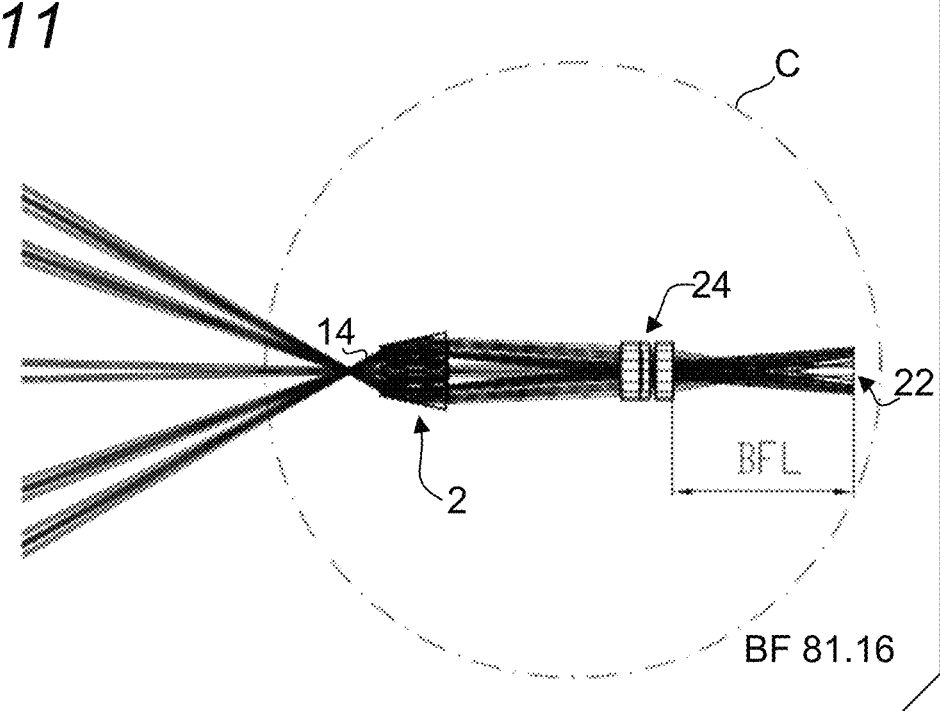

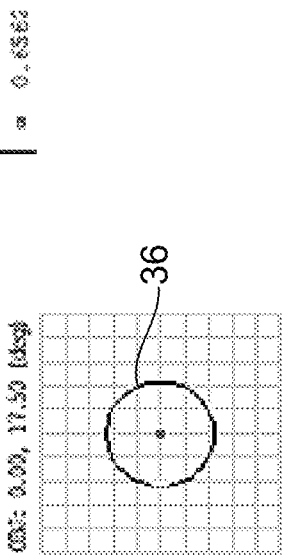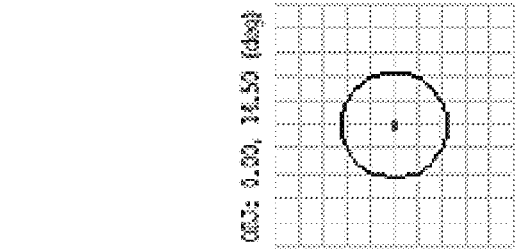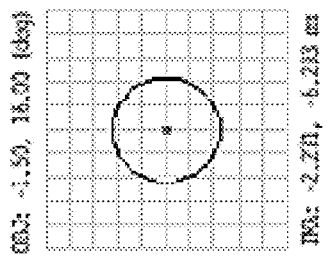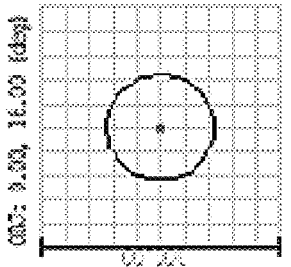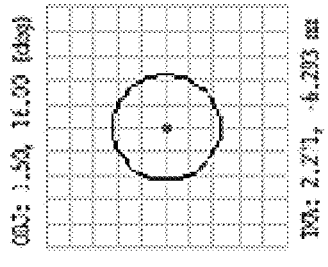
FIG. 13

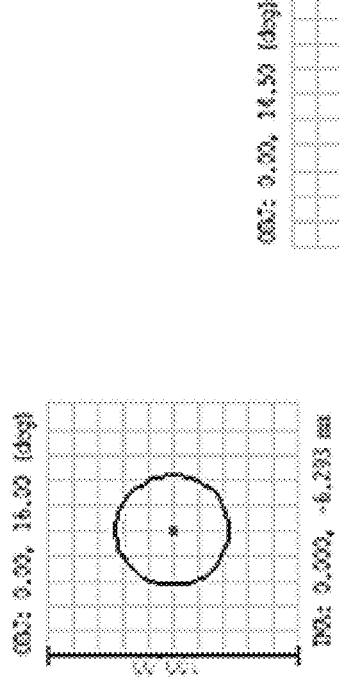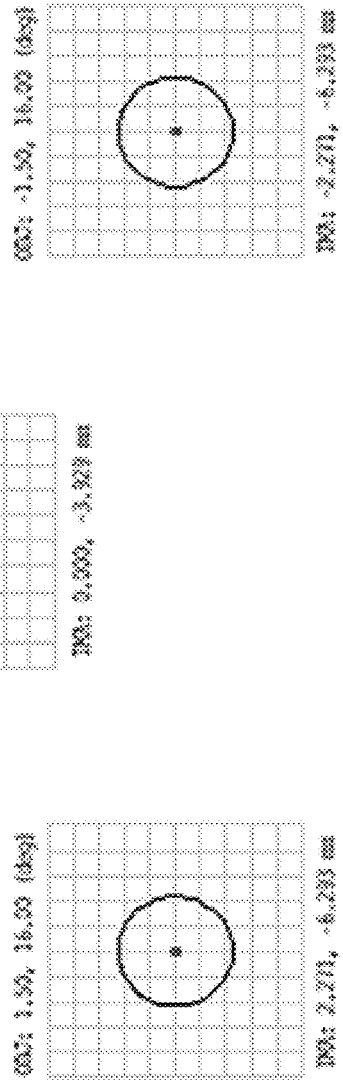
FIG. 21

PRISM TO ENABLE LARGE FOV HIGH RESOLUTION SAMPLING WITH SMALLER FOV IMAGING SYSTEM

BACKGROUND OF THE INVENTION

1. The Field of the Invention

The present invention relates to a small form factor imaging system suitable for large Field of View (FOV) high resolution sampling. More specifically, the present invention is directed to a prism module suitable for large Field of View (FOV) high resolution sampling.

2. Background Art

Conventional optical systems useful for directing large field of view (FOV) incident light beams in the realm of wearable glasses, e.g., augmented reality/virtual reality/mixed reality (AR/VR/MR) glasses typically occupy large areas. As there are at least two light-emitting sources to be tested for each pair of glasses where these light-emitting sources are disposed within a space further bound by a pair of temples, the space available for a fully-constructed or assembled pair of glasses for optical, functional and quality testing is even more limited. Further, considering that incoming beams to be tested or measured can occur at severe angles from the optical axes of ones' pupils, the optical systems useful for testing such glasses will need to have the ability to transmit incident beams at severe angles, due to the large FOV, to an imaging plane where the resulting images are collected and analyzed. Existing solutions, e.g., optical systems and elements which involve the use of mirrors, are large and occupy significant amounts of spaces and in some instances, may require the removal of temples of the AR/VR/MR glasses, especially those sized for children, thereby increasing the cost of testing and impacting the build quality of the glasses as more steps of assembly may be required and errors can be potentially introduced in each step.

There exists a need for sampling large field of view (FOV) light beams on a smaller FOV imaging system.

SUMMARY OF THE INVENTION

In accordance with the present invention, there is provided a prism module for enabling a large field of view high resolution sampling of incoming rays, the prism module including a plurality of elongated prisms disposed about a central axis, each of the prisms including:
  (a) a fore surface;
  (b) an aft surface; and
  (c) a reflecting surface connected on a first edge to the fore surface and connected on a second edge to the aft surface,
wherein the fore surface is configured to receive incoming light rays orthogonally disposed with respect to the fore surface, the reflecting surface configured to reflect the incoming light rays to cause outgoing light rays to exit at a right angle through the aft surface to form an image with a maximum distortion not recognizable by a human eye.

In one embodiment, the maximum distortion is about 2%. In one embodiment, the incoming light rays are light rays of a collimated light source, a convergent light source or a divergent light source. In one embodiment, at least one of the plurality of elongated prisms includes two triangular prisms. In one embodiment, at least one of the plurality of elongated prisms is disposed an angle of 0 degrees, 16 degrees, 23 degrees or 28 degrees with respect to the central axis.

An object of the present invention is to provide an optical element or system capable of sampling large field of view (FOV) light beams on a smaller FOV imaging system.

Another object of the present invention is to provide an optical element or system capable of sampling large field of view (FOV) light beams from wearable Augmented Reality/Virtual Reality/Mixed Reality (AR/VR/MR) goggles on a smaller FOV imaging system.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 depicts the use of the prism module for directing converging light beams, for instance, for a light input disposed at +0.65D virtual imaging distance (VID). In one embodiment, the back focal length (BFL) is about 92.93 mm.

FIG. 11 depicts the use of the prism module for directing diverging light beams, for instance, for a light input disposed at −0.65D VID. In one embodiment, the back focal length (BFL) is about 81.16 mm.

FIG. 13 depicts a spot diagram as a result of a test on the prism shown in FIG. 12.

FIG. 21 depicts a spot diagram as a result of a test on the prism shown in FIG. 20.

PARTS LIST

- 2—prism module
- 4—prism or elongated prism
- 6—fore surface
- 8—aft surface
- 10—reflecting surface
- 12—right angle
- 14—light ray
- 16—light source
- 18—Augmented Reality/Virtual Reality/Mixed Reality (AR/VR/MR) glasses
- 20—AR/VR/MR glasses temple
- 22—image plane
- 24—imaging lens
- 26—half of distance between temples or space constraint
- 28—temple length
- 30—clearance
- 32—distance between light source and prism module
- 34—central axis of prism
- 36—diffraction limited circle
- 38—spot diagram
- 40—angle
- 42—central axis of prism module
- 44—triangular prism
- 46—bottom surface of triangular prism
- 48—top surface of triangular prism
- 50—footprint diagram generated based on results collected from image plane

PARTICULAR ADVANTAGES OF THE INVENTION

The present optical element, embodied as a prism module, is capable of sampling large field of view (FOV) light beams on a smaller FOV imaging system while being compact in its form factor, thereby enabling its use in a limited space.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
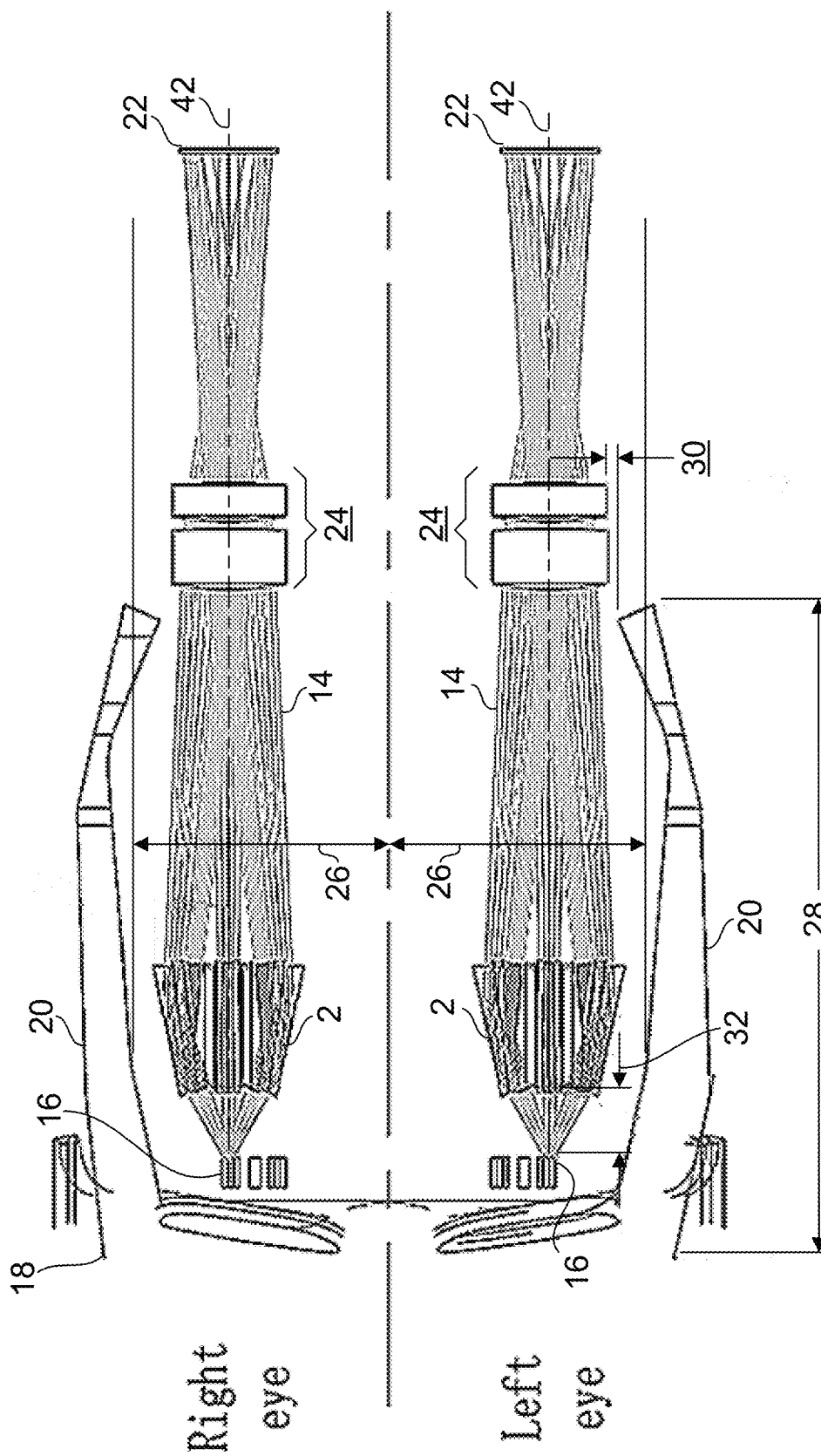
FIG. 1 is a diagram depicting the use of a pair of prism modules for sampling large field of view (FOV) light beams from a pair of virtual reality (VR) glasses on a smaller FOV imaging system.

FIG. 1 is a diagram depicting the use of a pair of prism modules 2 for sampling large field of view (FOV) light beams from light sources 16 of a pair of augmented reality/virtual reality/mixed reality (AR/VR/MR) glasses 18 on a smaller FOV imaging system embodied as an imaging system having an imaging plane 22. Shown in FIG. 1 is a pair of glasses with light sources 16 all of which are flanked by a pair of temples 20.

Figure 2:
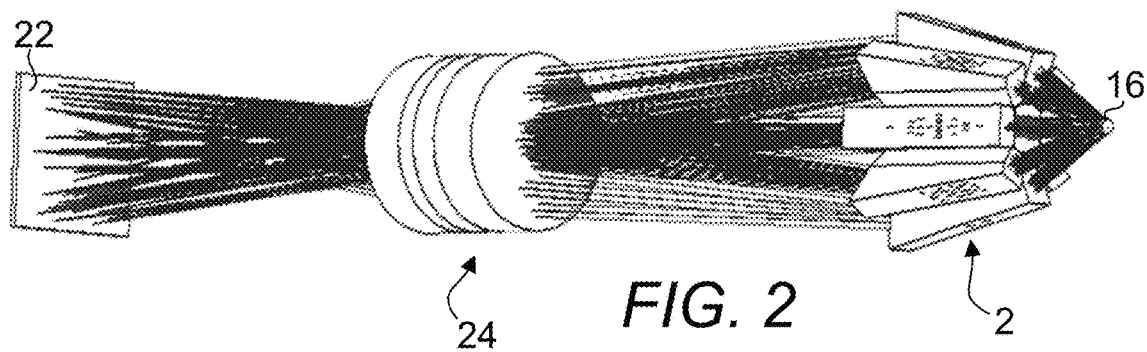
FIG. 2 is a diagram depicting a lower front view of a prism module useful for sampling large field of view (FOV) light beams on a smaller FOV imaging system.
Figure 3:
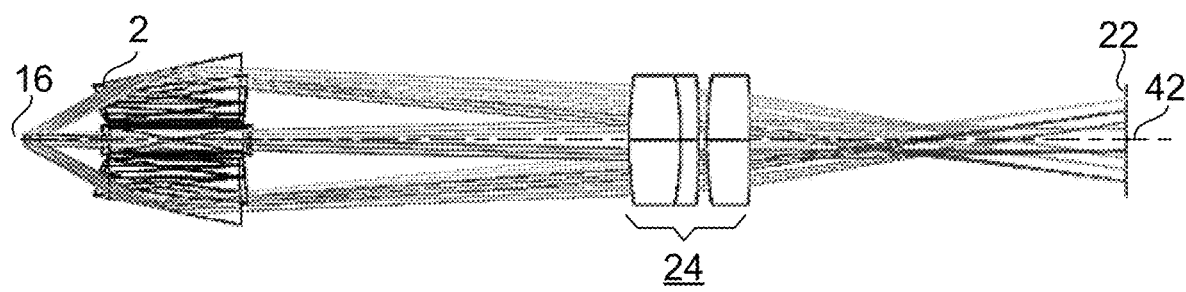
FIG. 3 is a diagram depicting a side view of a prism module useful for sampling large field of view (FOV) light beams on a smaller FOV imaging system.

Upon assembly, the glasses 18 are ready to be tested, e.g., for the purpose of quality control. As the temples 20 are an integral part of the glasses 18 from the perspective of optics (while disposed on a wearer's face) and controls of the glasses 18, any testing and measurements of the glasses are carried out or obtained without dismantling the temples 20 for access. In one example, the clearance afforded to a testing equipment is half the width between the pair of temples 20 as two testing equipment are required for the wearer's eyes. In one example, the temple-to-temple clearance at a lengthwise location of the temples where the testing equipment are disposed is about 130 mm. Therefore, the width of the space afforded to a testing equipment is only half the temple-to-temple clearance or about 65 mm. A present prism module 2 is configured to be disposed in this space. The prism module 2 enables a large field of view high resolution sampling of incoming rays as shown in FIG. 1 as well as other figures elsewhere herein. FIG. 2 is a diagram depicting a lower front view of a prism module 2 useful for sampling large field of view (FOV) light beams on a smaller FOV imaging system shown as an imaging system having an imaging plane 22. FIG. 3 is a diagram depicting a side view of a prism module 2 useful for sampling large field of view (FOV) light beams on a smaller FOV imaging system shown as an imaging system having an imaging plane 22.

Figure 4:
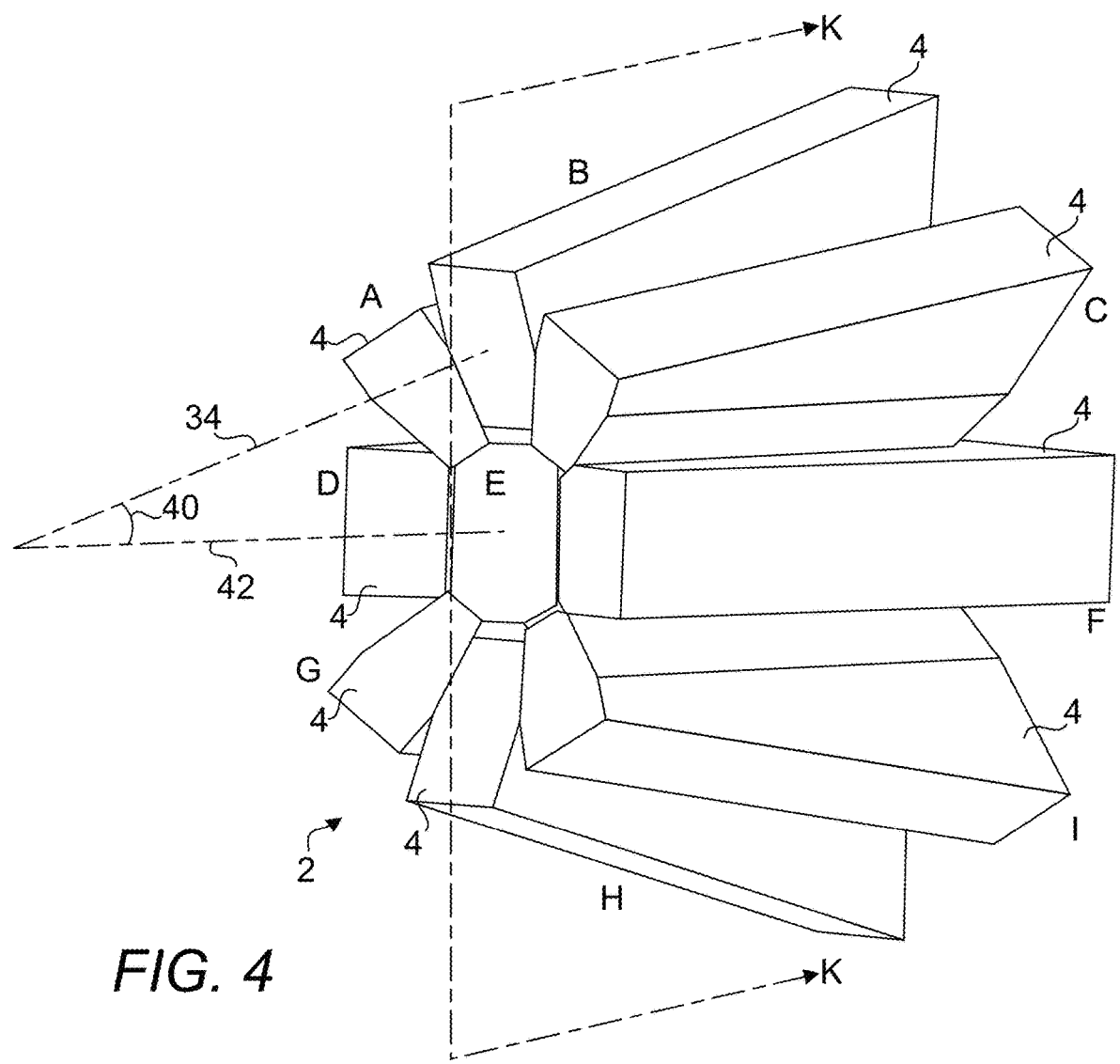
FIG. 4 is a front perspective view of a prism module.

FIG. 4 is a front perspective view of a prism module 2. The prism module 2 includes a plurality of elongated prisms 4 disposed about a central axis 42. In this embodiment, the prism module 2 includes eight prisms although the prism module 2 can be configured to have as many or few prisms as necessary. Each prism 4 includes a fore surface 6, an aft surface 8 and a reflecting surface 10 connected on a first edge to the fore surface 6 and connected on a second edge to the aft surface 8. The fore surface 6 is configured to receive the incoming light rays orthogonally disposed with respect to the fore surface 6, the reflecting surface 10 configured to reflect the incoming light rays to cause outgoing light rays to exit at a right angle 12 through the aft surface 8 to form an image with a maximum distortion not recognizable by a human eye. As shown in FIG. 1, in order to minimize the FOV, a light source 16 is transmitted through a prism module 2 to light rays 14 at a footprint suitable for an imaging lens 24 disposed between the prism module 2 and an image plane 22.

Figure 5:
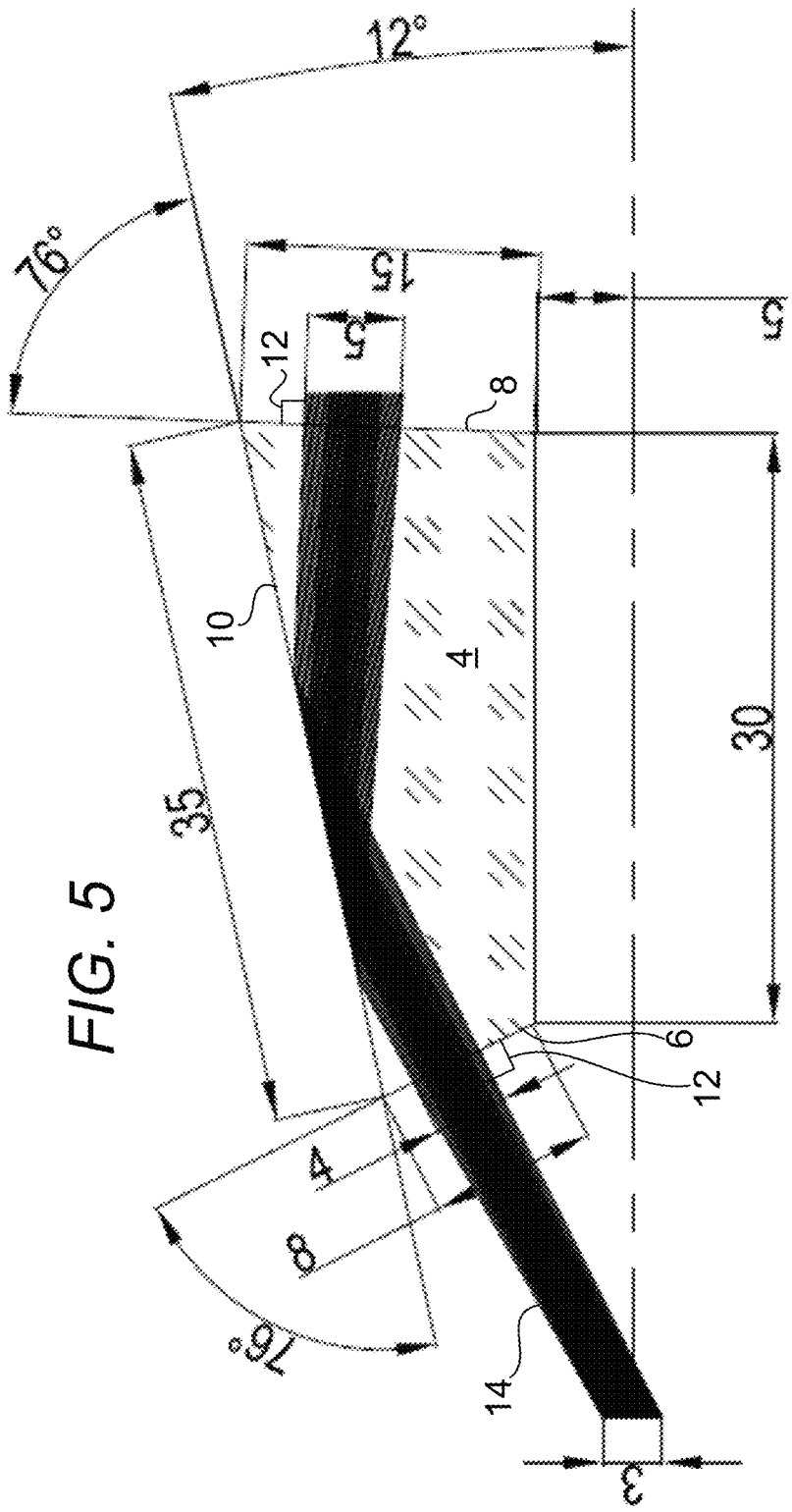
FIG. 5 is a side view of a prism of a prism module.
Figure 5A:
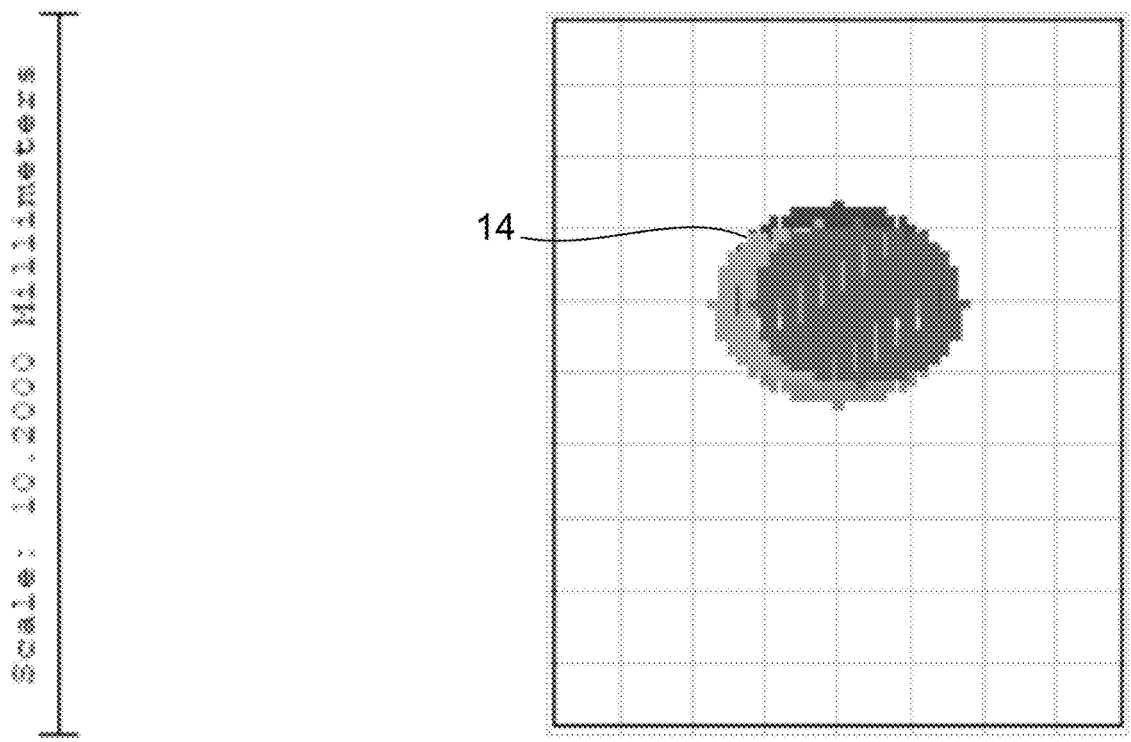
FIG. 5A is a footprint diagram of light beams at the fore surface of a prism of the prism module of FIG. 5.
Figure 5B:
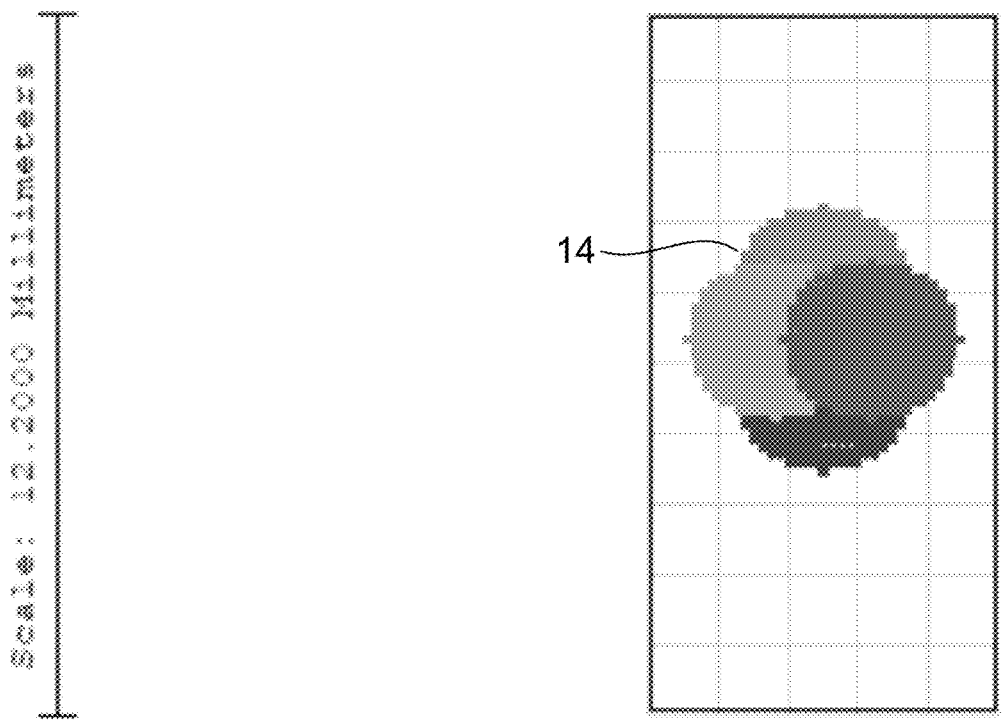
FIG. 5B is a footprint diagram of light beams at the aft surface of the same prism of FIG. 5A.

FIG. 5 is a side view of a prism 4 of a prism module 2, e.g., as a result of creating a cross-sectional view of prism B when the prism module 2 is sectioned along line K-K. Light beams 14 are shown disposed through the prism 4. FIG. 5A is a footprint diagram of light beams 14 at the fore surface 6 of a prism of the prism module of FIG. 5. FIG. 5B is a footprint diagram of light beams 14 at the aft surface 8 of the same prism of FIG. 5A. In one example, the height of the fore surface 6 measures about 8 mm, the length of the reflecting surface 10 measures about 35 mm and the height of the aft surface 8 measures about 15 mm. Referring back to FIG. 1, in one example, the length 28 of a temple 20 measures about 173 mm and care must also be taken to ensure that the optical path clears the entire length of a temple 20 in its erected position. Here, a clearance 30 of about 3 mm is provided for the imaging lens 24 in a direction transverse to the optical path of the imaging lens 24. In one embodiment, the distance 32 between the light source 16 and the prism module 2 is about 17 mm.

Figure 6:
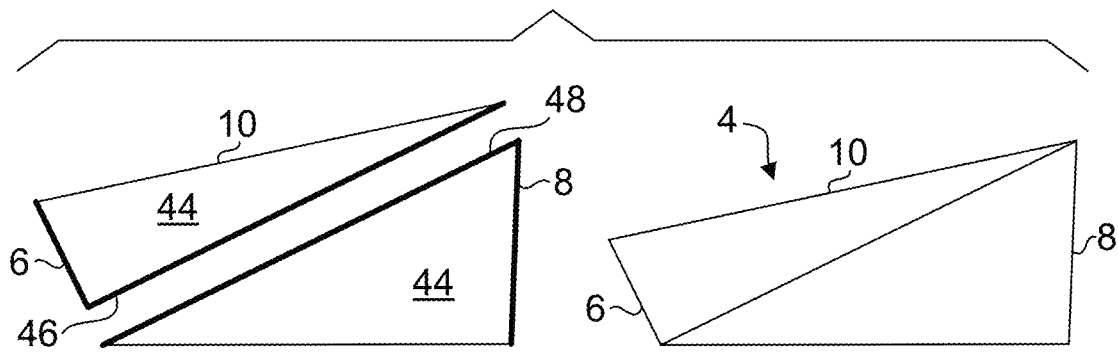
FIG. 6 is a side view of a prism and its constituents.

FIG. 6 is a side view of a prism and its constituents. In one embodiment, a prism 4 can be composed of two triangular prisms 44 as shown on the left of the figure. The triangular prism 44 on the top is combined with the triangular prism 44 on the bottom such that the bottom surface 46 of the top triangular prism 44 is mated with the top surface 48 of the bottom triangular prism 44 to form the prism 4 on the right of the figure.

Figure 7:
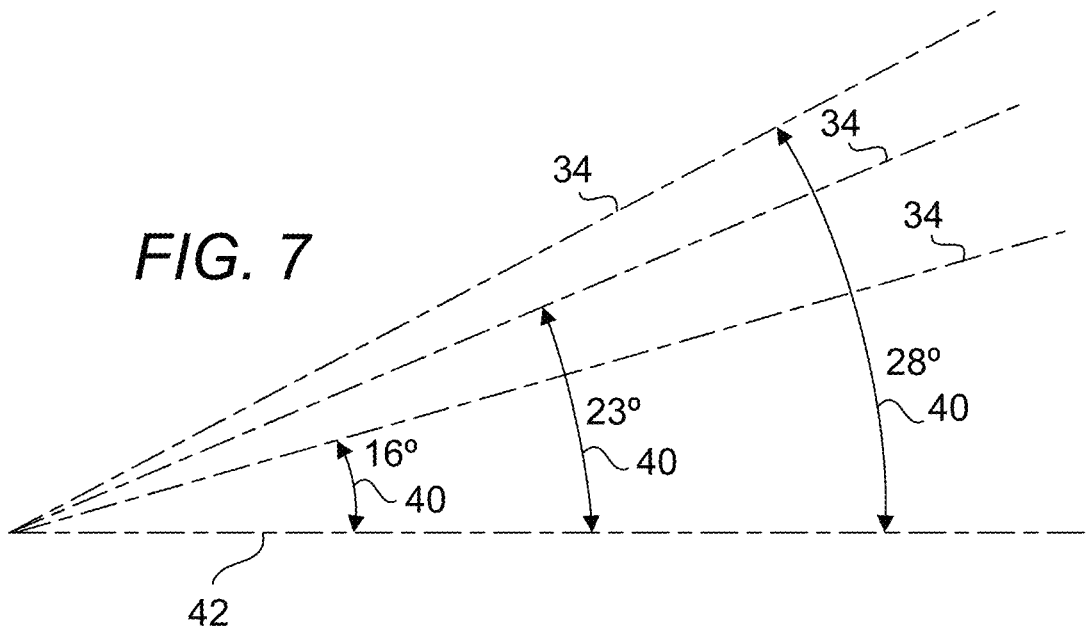
FIG. 7 is a diagram depicting the angles of incident light beams of various prisms of a prism module.
Figure 8:
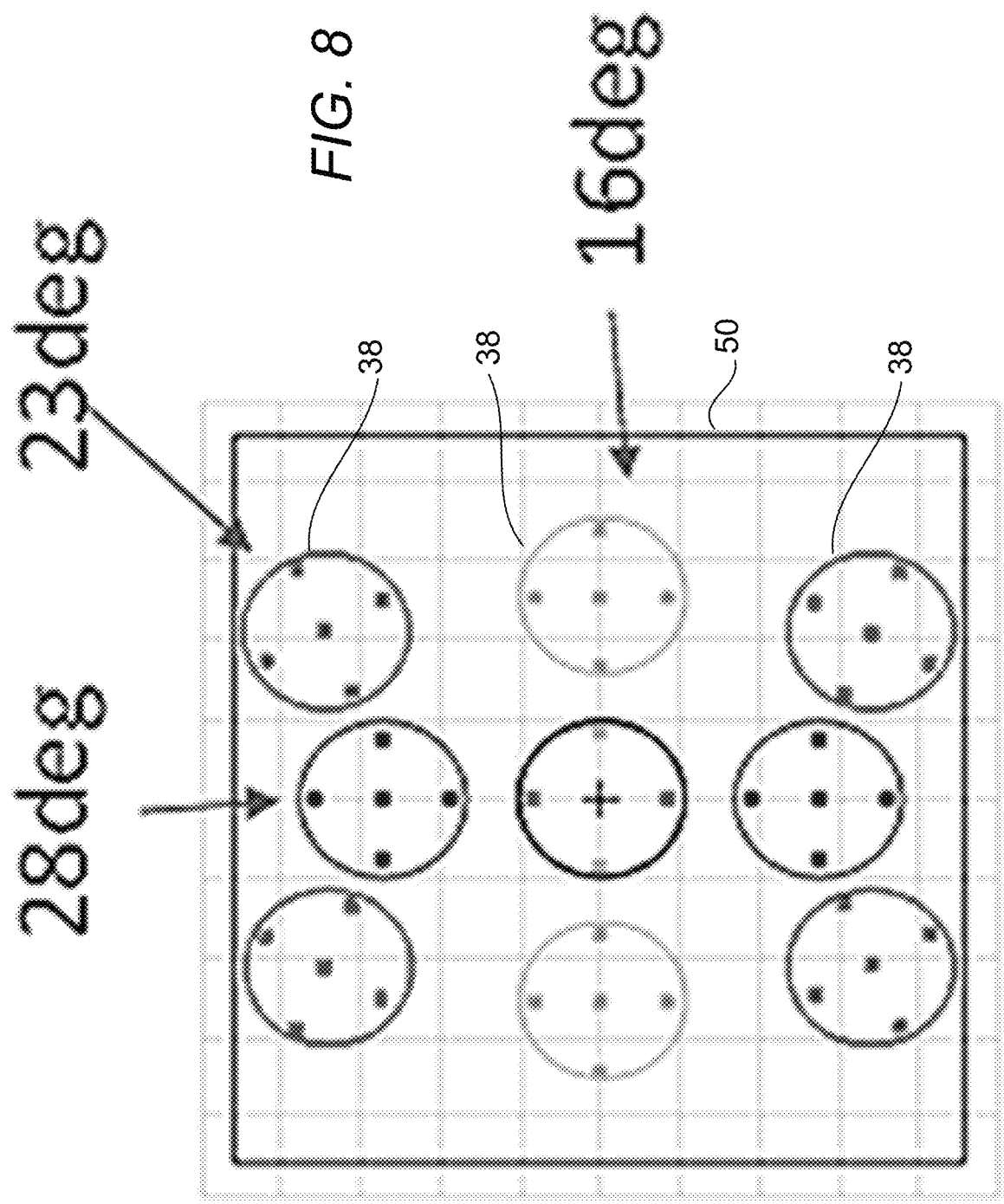
FIG. 8 is a footprint diagram showing the results of a test on a prism module.

FIG. 7 is a diagram depicting the angles of incident light beams of various prisms 4 of a prism module 2. Applicant discovered that by arranging the prisms 4 in a particular angle 40 from the central axis of the prism module 2, the resulting rays can be formed on the image plane 22 in a compact manner, reducing the amount of empty and unused areas on the image plane 22. Referring to FIGS. 4, 7 and 8, it shall be noted that, in one embodiment, the prisms 4 of the prism module 2 are disposed at various angles with respect to the central axis 42 of the prism module 2. Here, incident rays are aligned orthogonally with the fore surfaces 6 of the prisms 4 at angles of 16, 23 and 28 degrees from the central axis 42 of the prism module 2. Prism E that is disposed centrally is said to be disposed at 0 degrees with respect to the central axis 42 of the prism module 2 as the central axis 42 is disposed centrally through it. Prisms A, C, G and I are disposed at 23 degrees from the central axis 42. Prisms B and H are disposed at 28 degrees from the central axis 42. Prisms D and F are disposed at 16 degrees from the central axis 42.

FIG. 8 is a footprint diagram 50 showing the results of a test on a prism module 2. Note the compact nature of the spot diagrams 38 that are generated based on the results collected from the image plane 22.

Figure 10:
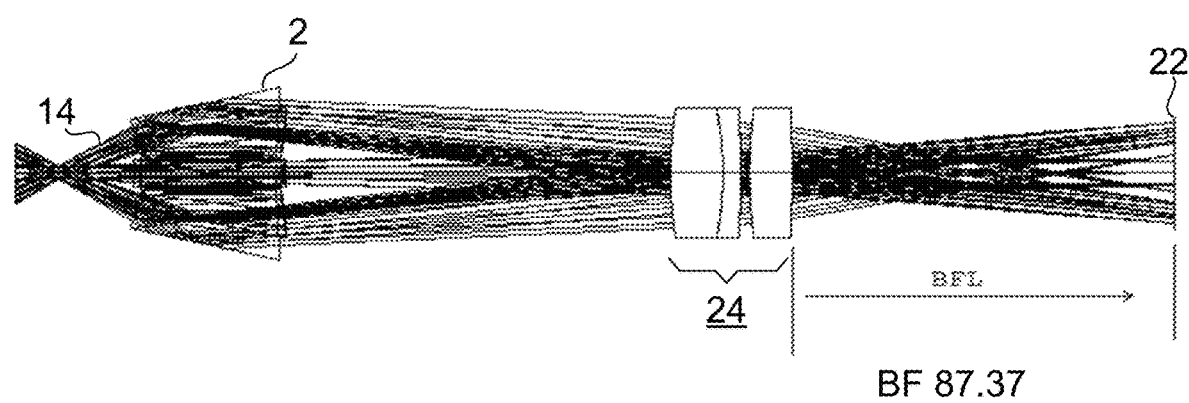
FIG. 10 depicts the use of the prism module for directing light beams disposed at infinity VID. In one embodiment, the back focal length (BFL) is about 87.37 mm.

FIG. 9 depicts the use of the prism module for directing converging light beams, for instance, for a light input disposed at +0.65D virtual imaging distance (VID). In one embodiment, the back focal length (BFL) is about 92.93 mm. FIG. 10 depicts the use of the prism module for directing light beams disposed at infinity VID. In one embodiment, the back focal length (BFL) is about 87.37 mm. FIG. 11 depicts the use of the prism module for directing diverging light beams, for instance, for a light input disposed at −0.65D VID. In one embodiment, the back focal length (BFL) is about 81.16 mm. Note the large FOV of the light source of the diverging light beams as in the case of FIG. 11 and the ability for the present prism module 2 to be used to transmit diverging light beams while it is also suitable for transmitting converging and collimated light beams as in the case of FIG. 9 and FIG. 10, respectively.

In ensuring that the prism module 2 is useful for enabling a large FOV high resolution sampling of incoming rays, measurements are taken to ensure that the prism module 2 can produce satisfactory results for each type of incoming rays, i.e., converging, collimated and diverging light beams. FIGS. 12-15 represent a result set obtained for a virtual imaging distance (VID) of infinity, i.e., with collimated light rays at 28 degrees from the central axis 42. FIGS. 16-19 represent a result set obtained for a VID of infinity, i.e., with collimated light rays at 23 degrees from the central axis 42. FIGS. 20-23 represent a result set obtained for a VID of infinity, i.e., with collimated light rays at 16 degrees from the central axis 42.

Figure 12:
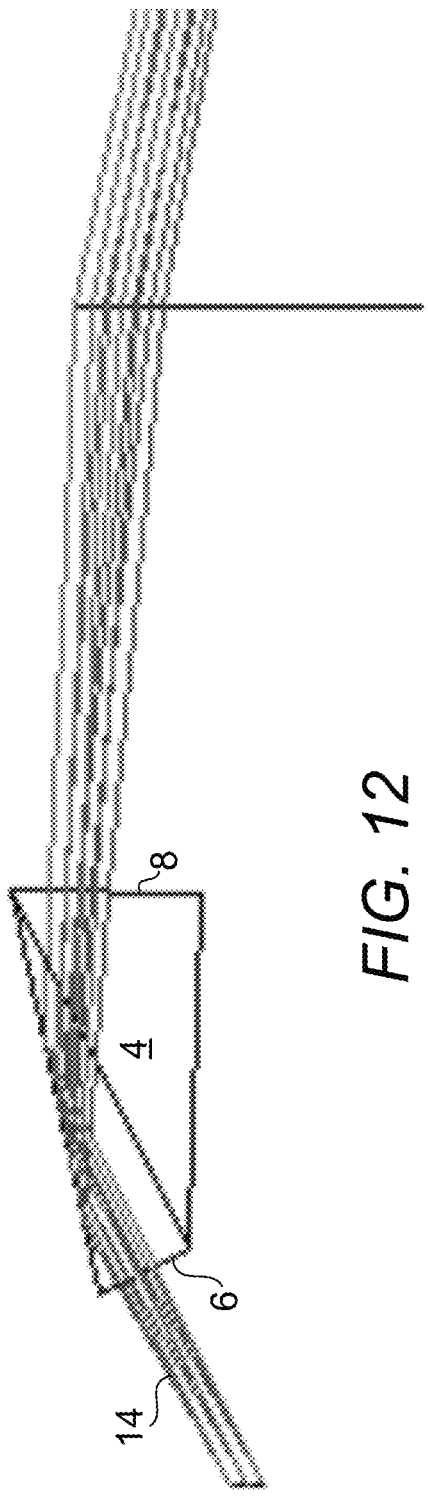
FIG. 12 is a side view depicting a prism for directing light beams disposed at about 28 degrees to a central axis of a prism module.
Figure 14:
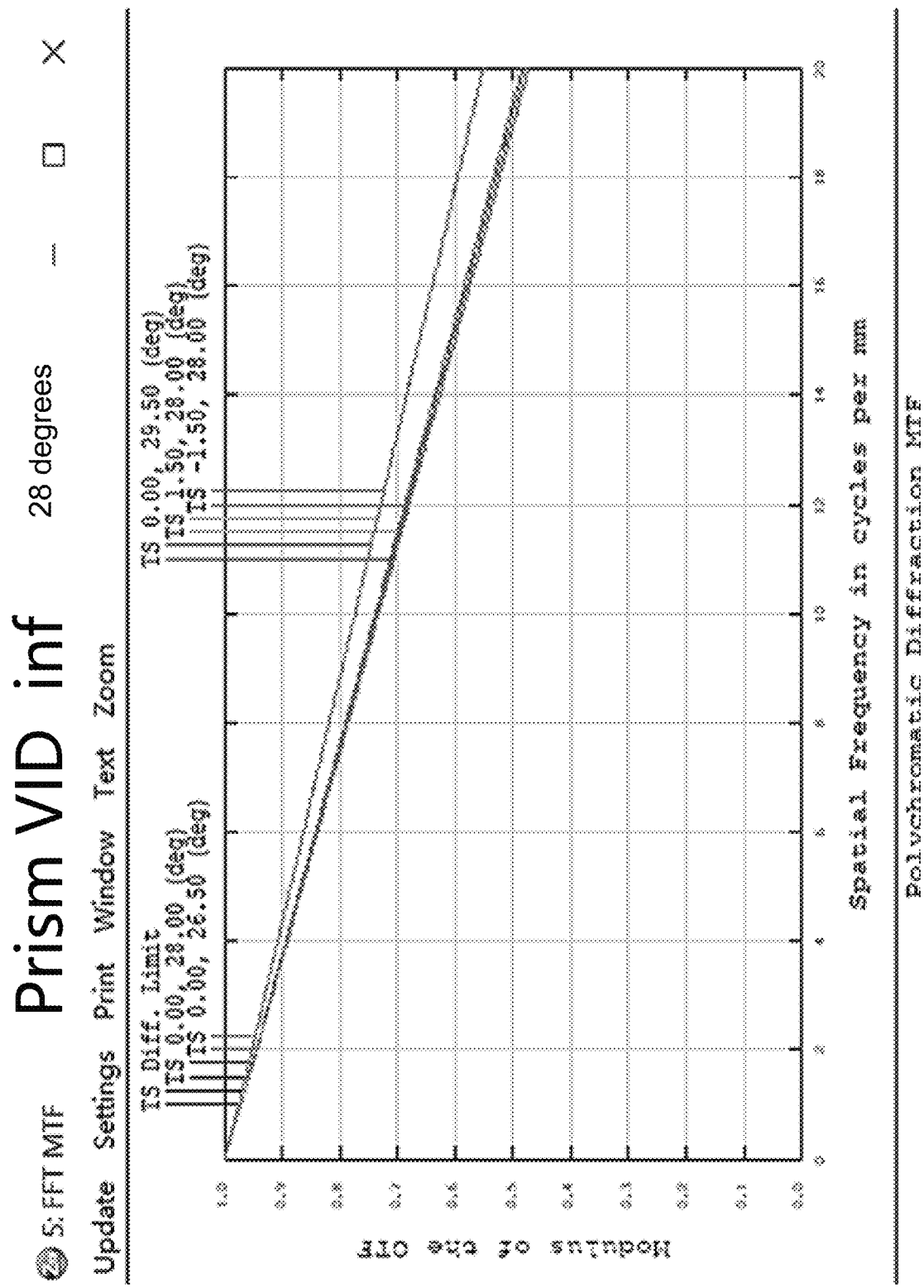
FIG. 14 is a polychromatic diffraction modulation transfer function (MTF) diagram as a result of a test on the prism shown in FIG. 12.
Figure 15:
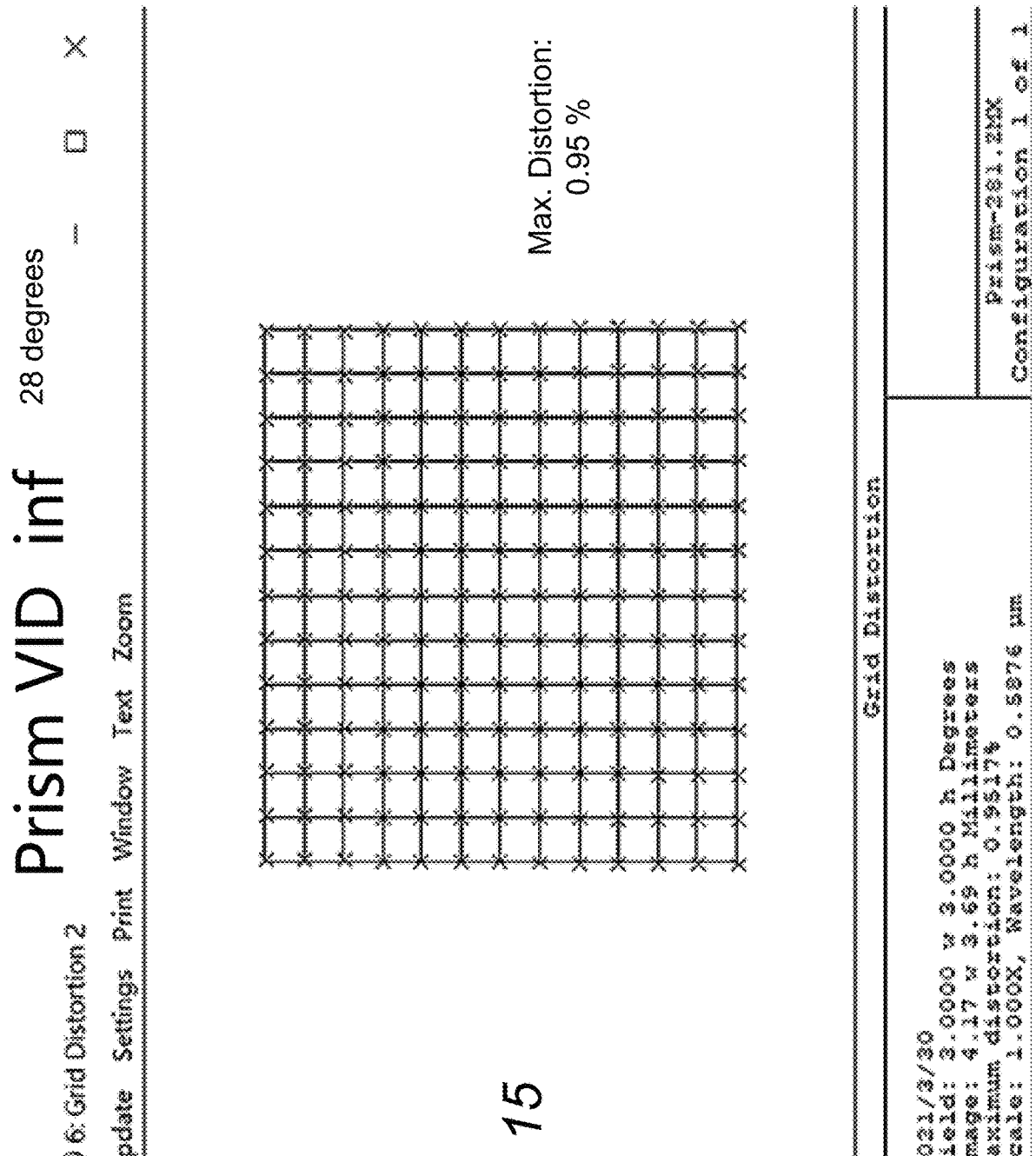
FIG. 15 is a distortion chart obtained as a result of a test on the prism shown in FIG. 12.

FIG. 12 is a side view depicting a prism for directing light beams disposed at about 28 degrees to a central axis of prism module. The direction of the light beams can be represented by the central axis 34 of a prism. FIG. 13 depicts a spot diagram as a result of a test on the prism shown in FIG. 12. Note that the dot within each diffraction limited circle 36 that is disposed well within the circle, signifying that little diffraction is detected in the light beams incident upon the image plane 22. FIG. 14 is a polychromatic diffraction modulation transfer function (MTF) diagram as a result of a test on the prism shown in FIG. 12. FIG. 15 is a distortion chart obtained as a result of a test on the prism shown in FIG. 12. It shall be noted that the maximum distortion is about 0.95%.

Figure 16:
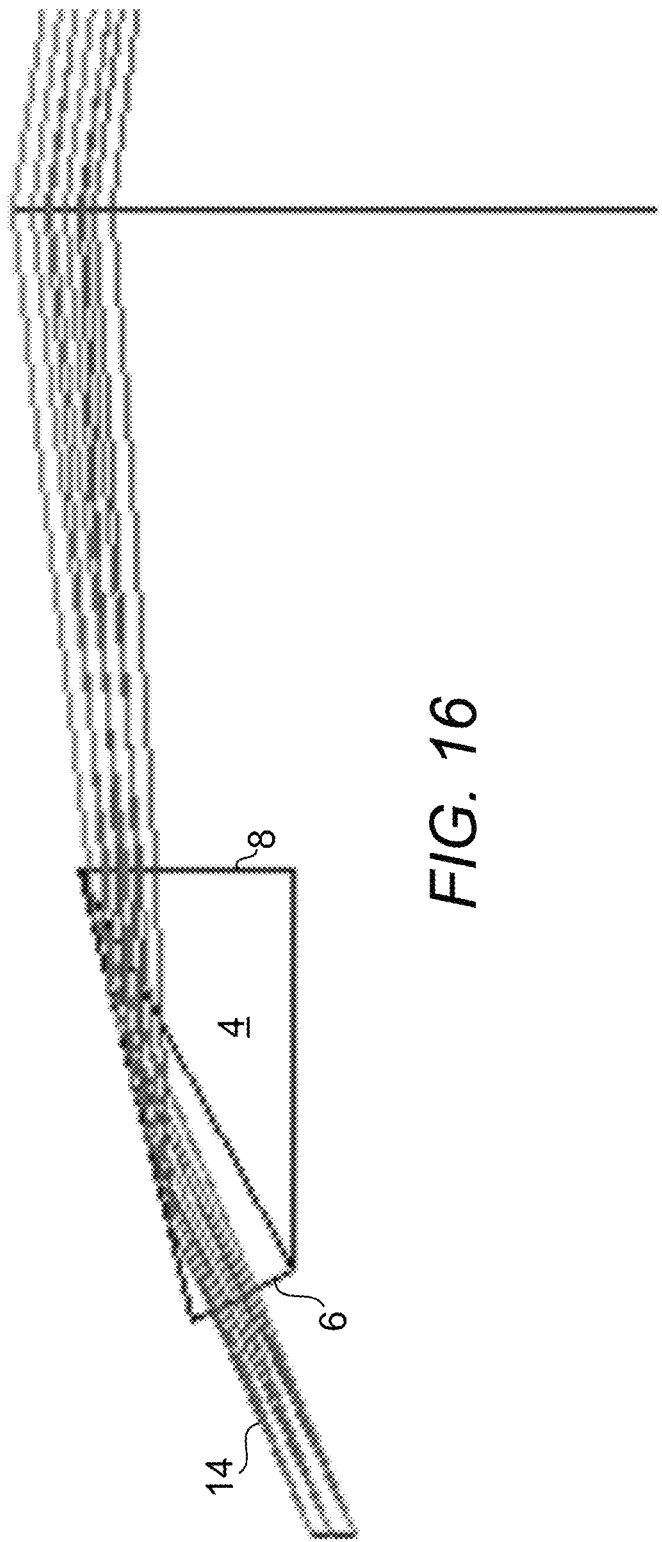
FIG. 16 is a side view depicting a prism for directing light beams disposed at about 23 degrees to a central axis of a prism module.
Figure 17:
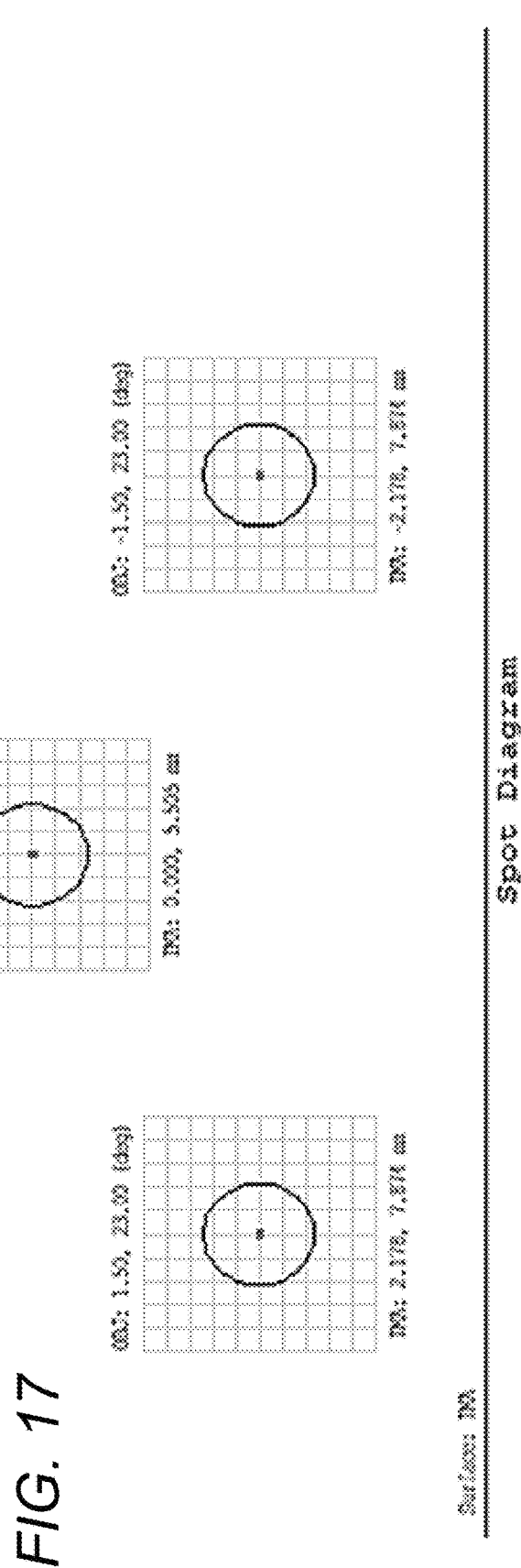
FIG. 17 depicts a spot diagram as a result of a test on the prism shown in FIG. 16.
Figure 18:
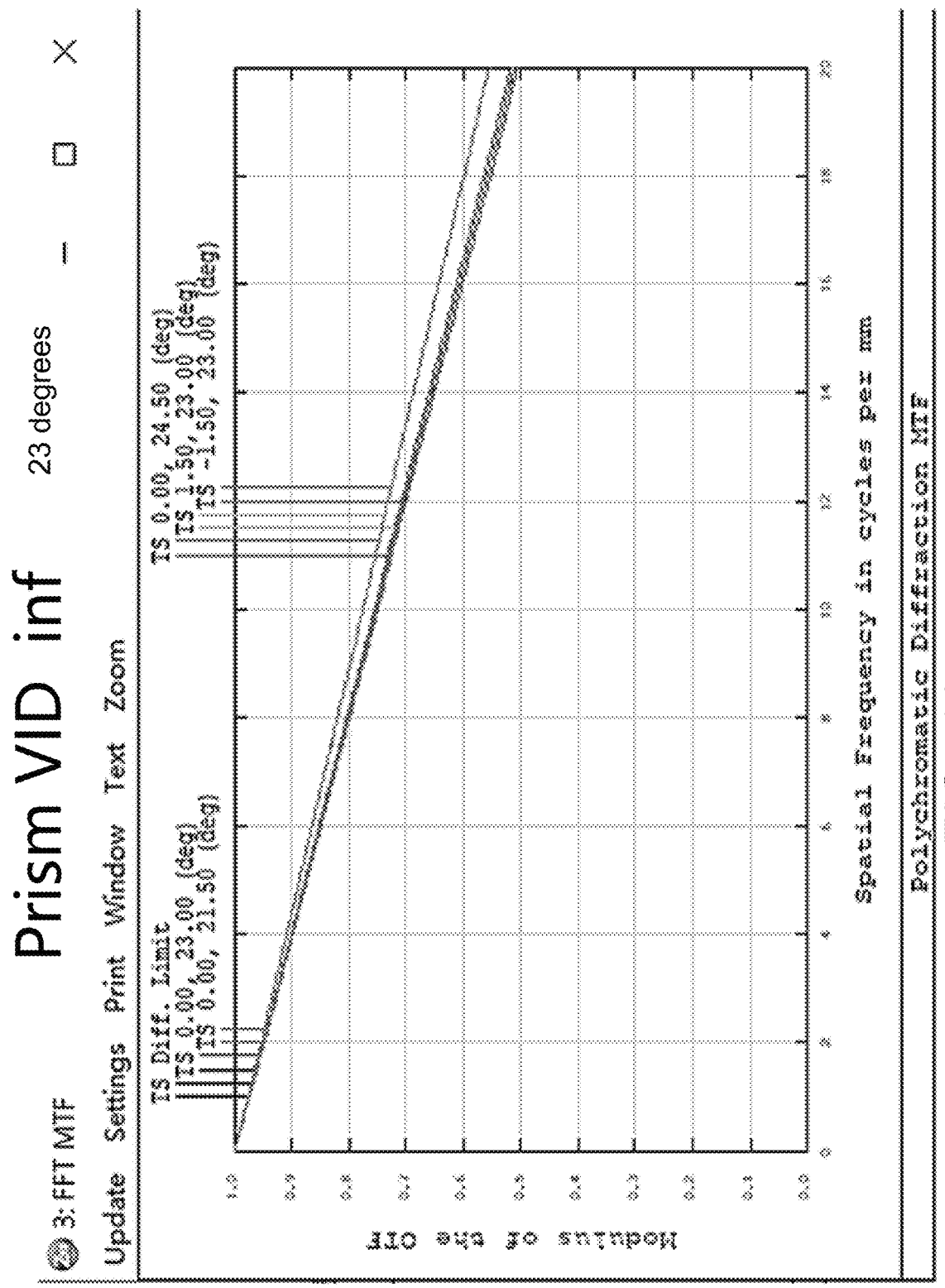
FIG. 18 is a polychromatic diffraction MTF diagram as a result of a test on the prism shown in FIG. 16.
Figure 19:
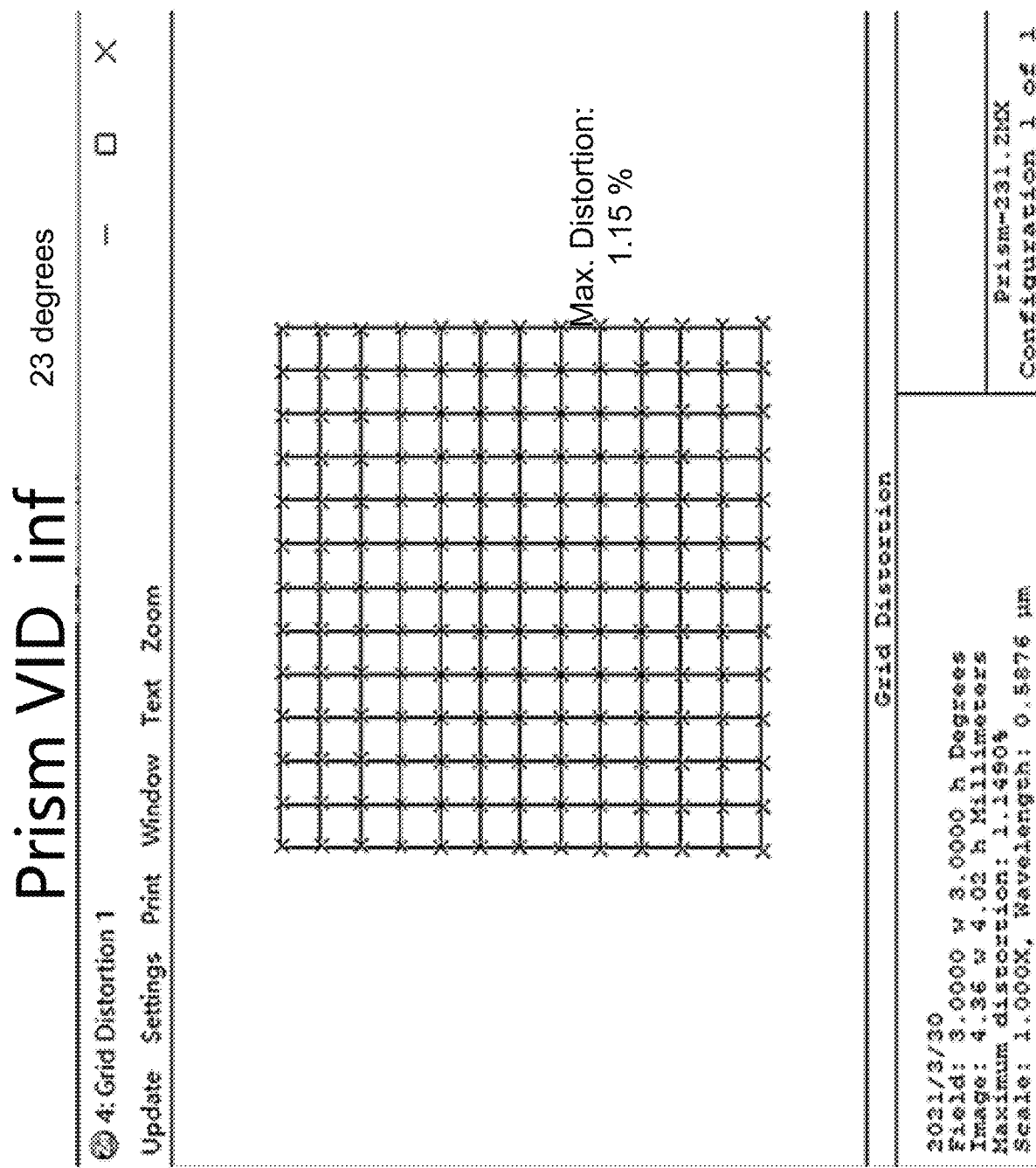
FIG. 19 is a distortion chart obtained as a result of a test on the prism shown in FIG. 16.

FIG. 16 is a side view depicting a prism for directing light beams disposed at about 23 degrees to a horizontal axis. FIG. 17 depicts a spot diagram as a result of a test on the prism shown in FIG. 16. FIG. 18 is a polychromatic diffraction MTF diagram as a result of a test on the prism shown in FIG. 16. FIG. 19 is a distortion chart obtained as a result of a test on the prism shown in FIG. 16. It shall be noted that the maximum distortion is about 1.15%.

Figure 20:
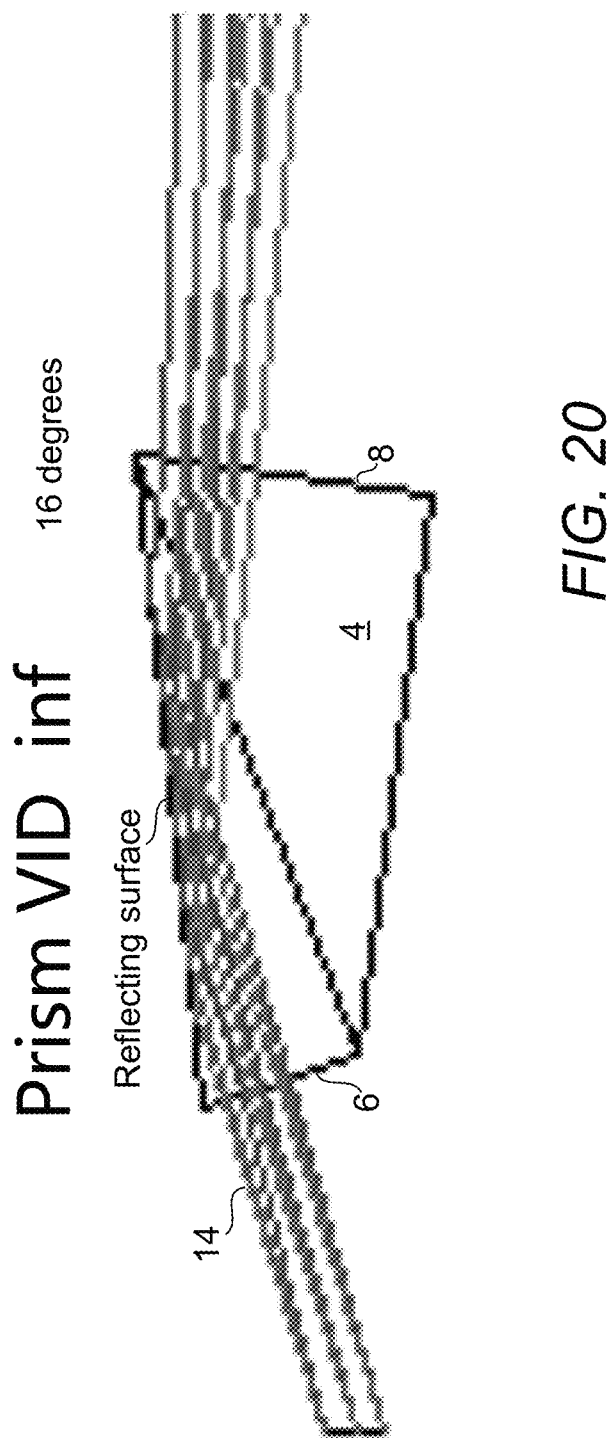
FIG. 20 is a side view depicting a prism for directing light beams disposed at about 23 degrees to a central axis of a prism module.
Figure 22:
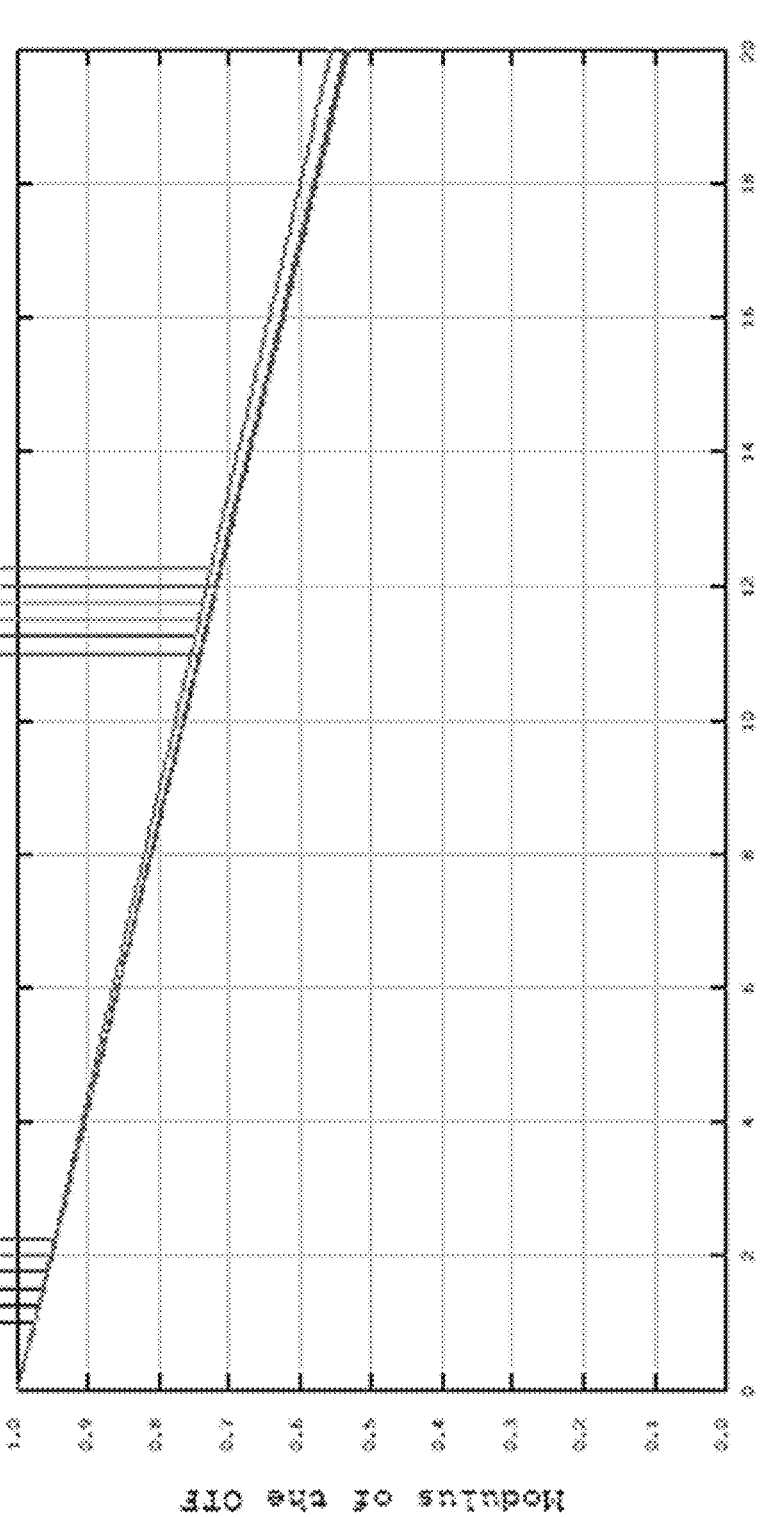
FIG. 22 is a polychromatic diffraction MTF diagram as a result of a test on the prism shown in FIG. 20.
Figure 23:
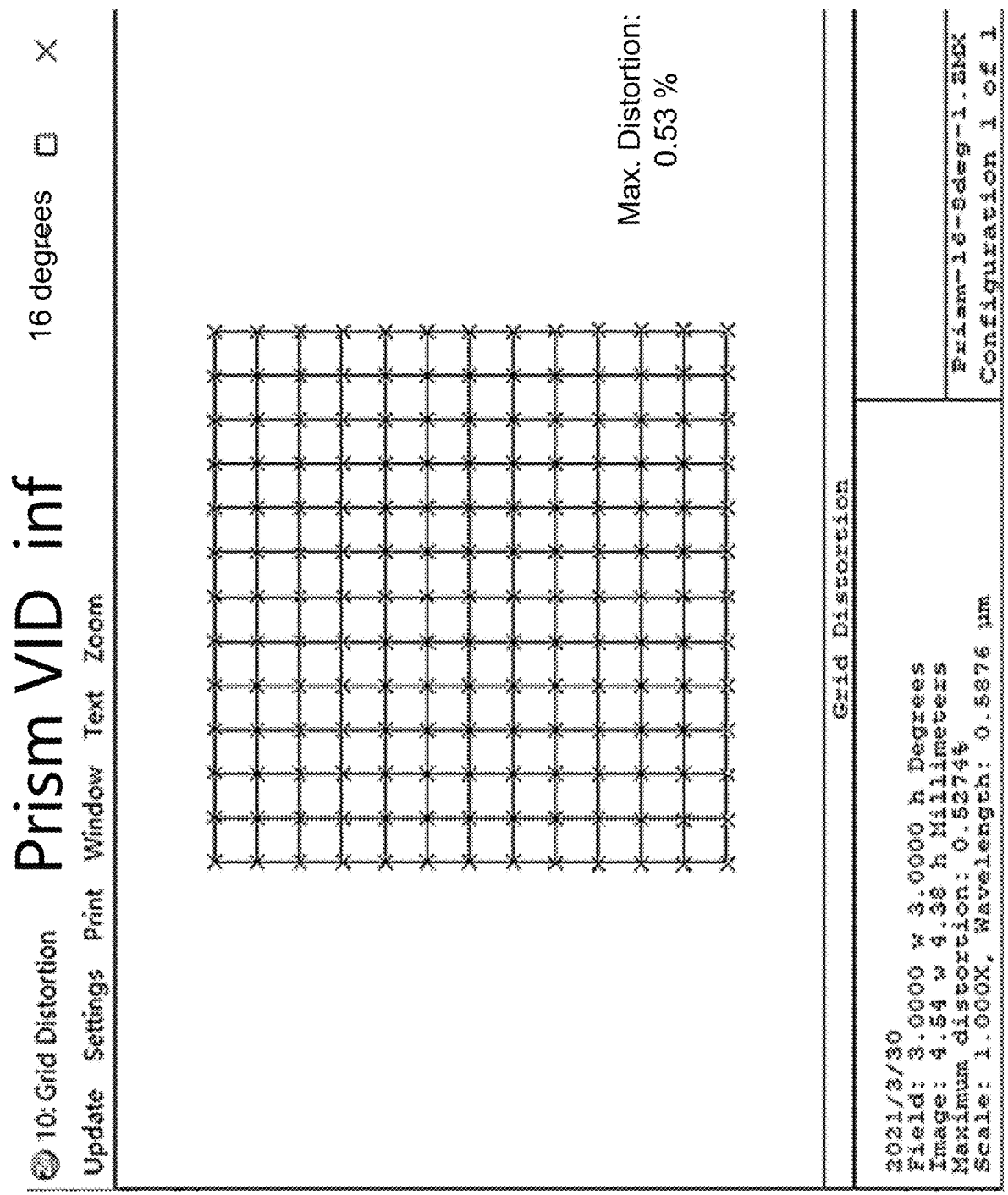
FIG. 23 is a distortion chart obtained as a result of a test on the prism shown in FIG. 20.

FIG. 20 is a side view depicting a prism for directing light beams disposed at about 23 degrees to a horizontal axis. FIG. 21 depicts a spot diagram as a result of a test on the prism shown in FIG. 20. FIG. 22 is a polychromatic diffraction MTF diagram as a result of a test on the prism shown in FIG. 20. FIG. 23 is a distortion chart obtained as a result of a test on the prism shown in FIG. 20. It shall be noted that the maximum distortion is about 0.53%. In general, it can be summarized that the maximum distortion that results from using the present prism module has been confined to within 2% and this is a distortion not recognizable by a human eye.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive,

What is claimed herein is:

1. A single prism for enabling a large field of view high resolution sampling of incoming rays, said single prism comprising:
   (a) a fore surface;
   (b) an aft surface; and
   (c) a reflecting surface connected on a first edge to said fore surface and connected on a second edge to said aft surface,
   wherein said fore surface is configured to receive incoming light rays orthogonally disposed with respect to said fore surface, said reflecting surface configured to reflect the incoming light rays to cause outgoing light rays to exit at a right angle through said aft surface to form an image with a maximum distortion not recognizable by a human eye without traversing an air gap between said fore surface and said aft surface.

2. The prism of claim 1, wherein said maximum distortion is about 2%.

3. The prism of claim 1, comprising two triangular prisms.

4. A prism module for enabling a large field of view high resolution sampling of incoming rays, said prism module comprising a plurality of single elongated prisms disposed about a central axis, each said single elongated prism comprising:
   (a) a fore surface;
   (b) an aft surface; and
   (c) a reflecting surface connected on a first edge to said fore surface and connected on a second edge to said aft surface,
   wherein said fore surface is configured to receive incoming light rays orthogonally disposed with respect to said fore surface, said reflecting surface configured to reflect the incoming light rays to cause outgoing light rays to exit at a right angle through said aft surface to form an image with a maximum distortion not recognizable by a human eye without traversing an air gap between said fore surface and said aft surface.

5. The prism module of claim 4, wherein said maximum distortion is about 2%.

6. The prism module of claim 4, wherein the incoming light rays are light rays selected from the group consisting of a collimated light source, a convergent light source and a divergent light source.

7. The prism module of claim 4, at least one of said plurality of elongated prisms comprises two triangular prisms.

8. The prism module of claim 4, wherein at least one of said plurality of elongated prisms is disposed at an angle selected from the group consisting of 0 degrees, 16 degrees, 23 degrees and 28 degrees with respect to said central axis.

* * * * *